(12) United States Patent
Haapaniemi et al.

(10) Patent No.: US 11,713,215 B2
(45) Date of Patent: Aug. 1, 2023

(54) ELEVATOR ARRANGEMENT

(71) Applicant: KONE Corporation, Helsinki (FI)

(72) Inventors: Markku Haapaniemi, Helsinki (FI); Matti Räsänen, Helsinki (FI); Markku Häivälä, Helsinki (FI); Tarvo Viita-aho, Helsinki (FI); Jukka Laitinen, Helsinki (FI); Janne Mikkonen, Helsinki (FI); Anssi Venho, Helsinki (FI); Pekka Perunka, Helsinki (FI); Hans Valtonen, Helsinki (FI); Emil Hagström, Helsinki (FI); Simo Mäkimattila, Helsinki (FI)

(73) Assignee: KONE CORPORATION, Helsinki (FI)

( * ) Notice: Subject to any disclaimer, the term of this patent is extended or adjusted under 35 U.S.C. 154(b) by 134 days.

(21) Appl. No.: 16/785,245

(22) Filed: Feb. 7, 2020

(65) Prior Publication Data
US 2020/0255262 A1 Aug. 13, 2020

(30) Foreign Application Priority Data

Feb. 8, 2019 (EP) ..................................... 19156090

(51) Int. Cl.
*B66B 11/02* (2006.01)
(52) U.S. Cl.
CPC ................ *B66B 11/0226* (2013.01)
(58) Field of Classification Search
CPC ......... B66B 11/0226; B66B 11/0246
See application file for complete search history.

(56) References Cited

U.S. PATENT DOCUMENTS

| 2015/0314991 | A1* | 11/2015 | Trottman | .............. | G06F 1/16 |
| | | | | | 187/393 |
| 2016/0167923 | A1 | 6/2016 | Pirttiniemi | | |
| 2017/0328695 | A1* | 11/2017 | Keller | ................. | B65B 7/16 |
| 2019/0367324 | A1* | 12/2019 | Kim | .............. | B01D 46/0036 |

FOREIGN PATENT DOCUMENTS

| DE | 298 02 092 U1 | 11/1998 | | |
| DE | 102006023920 A1 | * 11/2007 | ......... | B66B 11/0246 |
| EP | 0870722 A1 | * 10/1998 | ............ | B66B 5/027 |
| EP | 2 910 511 A1 | 8/2015 | | |
| JP | 5-246662 A | 9/1993 | | |
| JP | 6-278973 A | 10/1994 | | |
| JP | 2007001698 A | * 1/2007 | ......... | B66B 11/0246 |

(Continued)

OTHER PUBLICATIONS

Mizuno, Yukiomi, Cage Ceiling Device for Elevator, Oct. 4, 1994, Machine translation of the description of JP H06278973 A (Year: 1994).*

(Continued)

*Primary Examiner* — Michael R Mansen
*Assistant Examiner* — Michelle M Lantrip
(74) *Attorney, Agent, or Firm* — Birch, Stewart, Kolasch & Birch, LLP

(57) ABSTRACT

An elevator arrangement having an elevator includes an elevator car having a floor and a roof. The elevator car is provided with one or more extension spaces which are arranged to extend the height of the elevator car during construction time use.

3 Claims, 4 Drawing Sheets

(56) References Cited

FOREIGN PATENT DOCUMENTS

Figure 1:
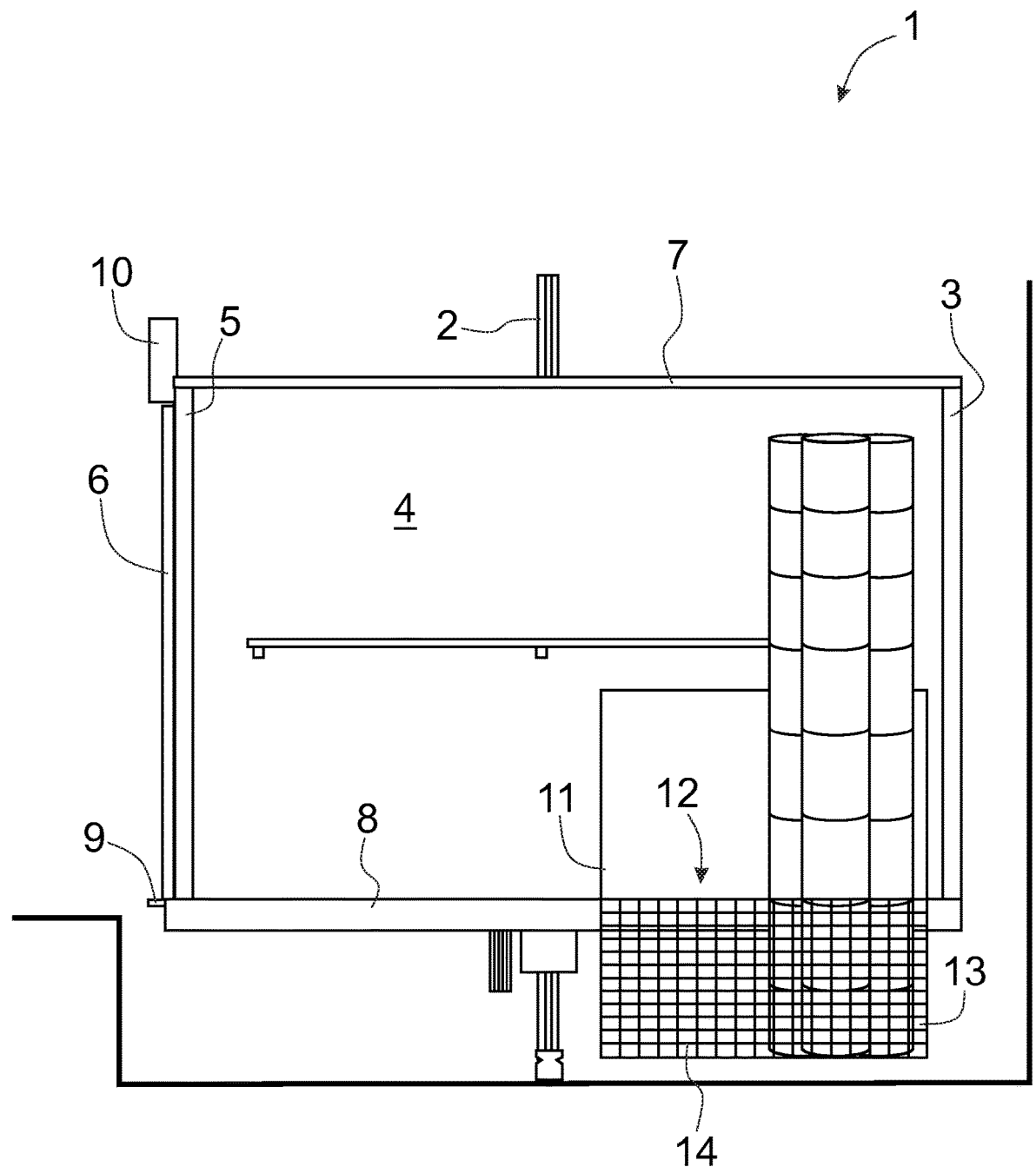

| | | | | |
|---|---|---|---|---|
| JP | 2007-230764 A | | 9/2007 | |
| JP | 4684021 B2 | * | 5/2011 | |
| JP | 2011098788 A | * | 5/2011 | |
| JP | 2015037983 A | * | 2/2015 | ......... B66B 11/0246 |
| KR | 101386256 B1 | * | 4/2014 | ............. B66B 5/027 |
| WO | WO-0189977 A1 | * | 11/2001 | ......... B66B 11/0246 |
| WO | WO 2018/011463 A | | 1/2018 | |
| WO | WO-2018011459 A1 | * | 1/2018 | ......... B66B 11/0246 |

OTHER PUBLICATIONS

Kiyama, Nobuaki, Elevator System, May 19, 2011, Machine translation of the description of JP 2011098788 A (Year: 2011).*
Search Report and Written Opinion issued in European Patent Application No. 19156090.3 dated Aug. 16, 2019.
English translation of Chinese Office Action for corresponding Application No. 2020100802883 dated Nov. 25, 2022.

* cited by examiner

ELEVATOR ARRANGEMENT

The present invention relates to an elevator arrangement as defined in the preamble of claim 1.

The invention in question relates particularly to using elevators on construction sites to move construction materials and parts to upper parts of buildings.

At construction sites it is common to use elevators as transportation means to move construction materials and parts up. Usually, the height of an elevator car is not more than 2500 mm. Hence, long construction parts, such as air pipes, façade elements etc. cannot be moved up with normal elevators because they are longer than the height of the elevator car. Instead, separate construction elevators or cranes must be used to transport long construction parts up. This causes several problems. Separate construction elevators create additional costs and they move quite slowly. The difference of speed of a normal elevator and a construction elevator can be quite significant. In addition, the weight limit of construction elevators is usually lower than what can be achieved with a normal elevator. Also, a separate construction elevator is usually fitted to a wall of a building and after it has been removed, the wall must be treated properly. Using construction cranes to move long and light construction parts is not effective, because the construction cranes are in high demand and should rather be used for other purposes, such as moving heavy construction parts and materials.

The vertical material transportation is critical in the success of high-rise construction projects, and the ways material can be moved gets more limited the taller the buildings get. Elevators are currently used during the construction time, and they provide a good and weather protected way to transport people and material. However, as mentioned earlier, they are limited in size and some elements are too long to be transported with normal elevators. Façade elements are one of the largest groups of items transported to the upper floors and the pace they are installed, has a critical importance, as they protect the building interior from the weather.

One objective of the present invention is to eliminate drawbacks of prior art technology and to achieve an elevator arrangement where the elevator car can be used to move also long construction materials and parts to the upper parts of buildings. Another objective of the present invention is to achieve an elevator arrangement where the transportation of construction materials and parts is fast, easy and safe. The elevator arrangement according to the invention is characterized by what is disclosed in the characterization part of claim 1. Other embodiments of the invention are characterized by what is disclosed in the other claims.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise, the different details presented in connection with each embodiment can also be applied in other embodiments. In addition, it can be stated that at least some of the subordinate claims can, in at least some situations, be deemed to be inventive in their own right.

In order to achieve the objectives mentioned above, the present invention provides an elevator arrangement having an elevator comprising an elevator car arranged to run up and down in an elevator shaft along guide rails. The elevator car comprises one or more openings to one or more extension spaces outside the elevator car, which extension spaces increase the height of the elevator car. The extension spaces are surrounded with covering members, which protect materials and parts being transported from being damaged for example caused by them hitting a wall of the elevator shaft.

One advantage of the solution according to the invention is that also long construction parts can be moved to upper parts of a building using a normal elevator already assembled to the building because the height of the elevator car can be increased.

Another advantage is that adjusting the height of the elevator car and car sling is fast and easy.

Another advantage is that there is no need for a separate construction elevator, which lowers construction costs and enables faster transportation of construction materials and parts to the upper parts of buildings. Yet another advantage is that a construction crane can be used more efficiently on the construction site because it is not needed to hoist so many parts to upper parts of a building.

Yet another advantage of the invention is that the arrangement is simple and inexpensive and provides light weight structure.

Yet a further advantage of the invention is that after construction time use (CTU) it is easy, fast and cost-efficient to convert the elevator to a normal elevator which is used to transport passengers.

Figure 2:
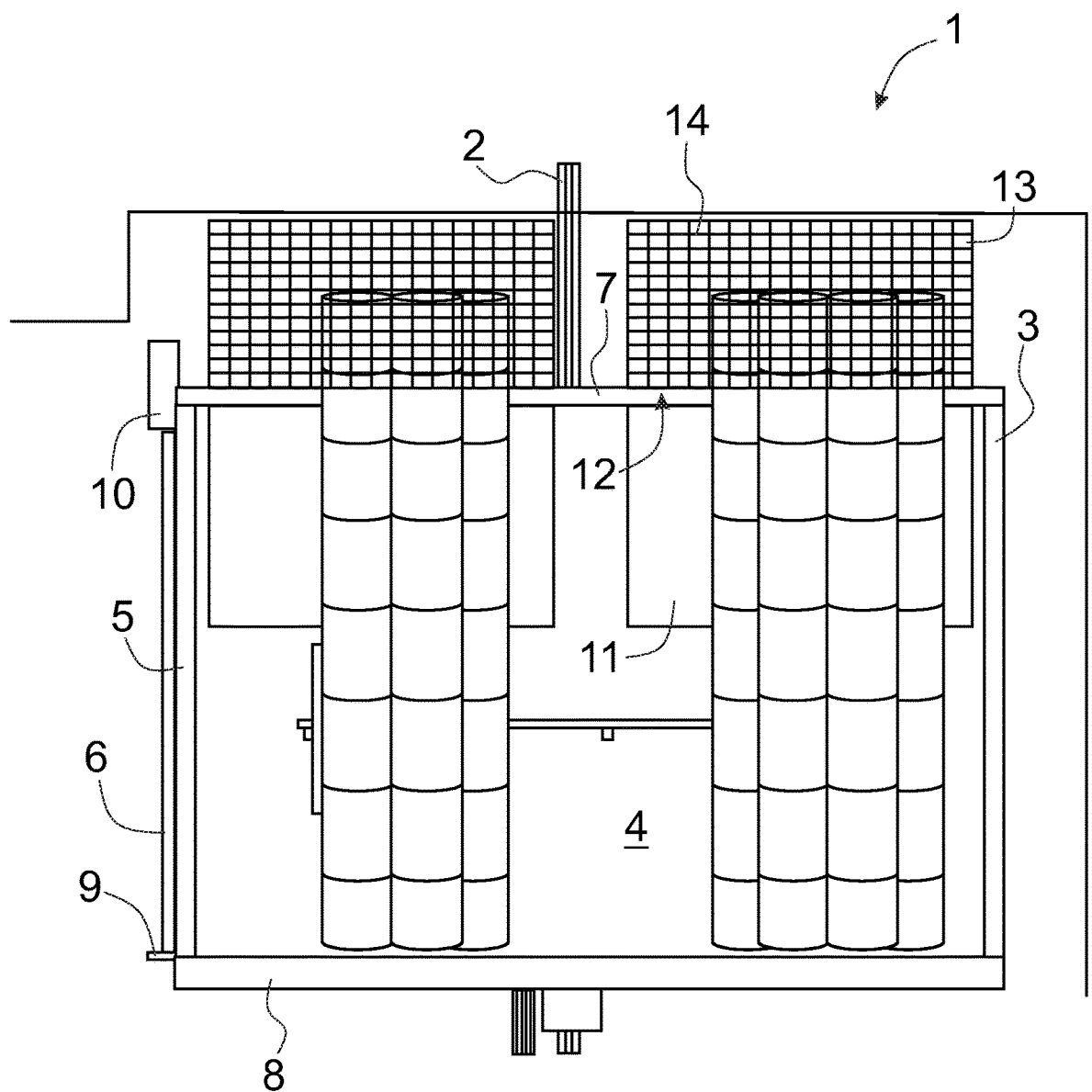
Figure 3:
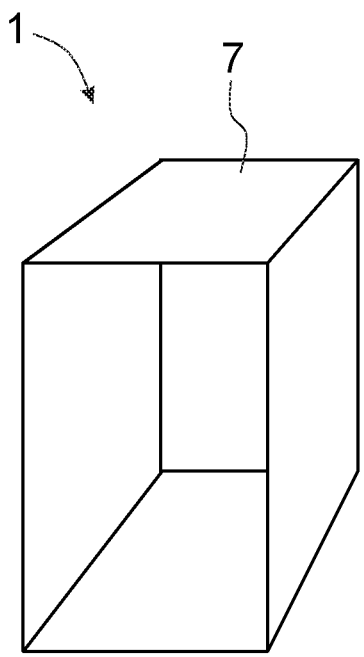
Figure 4:
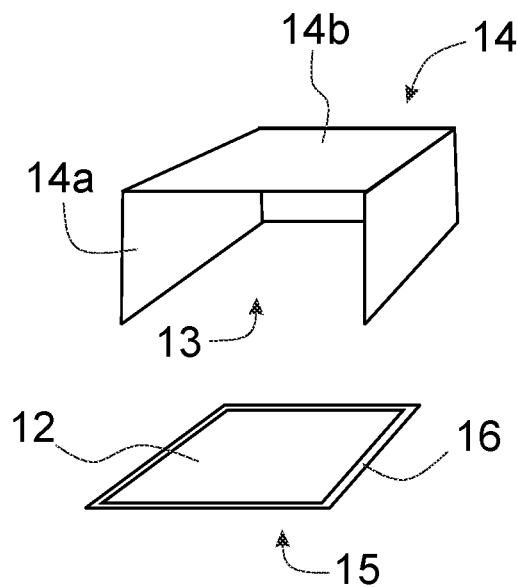
Figure 5:
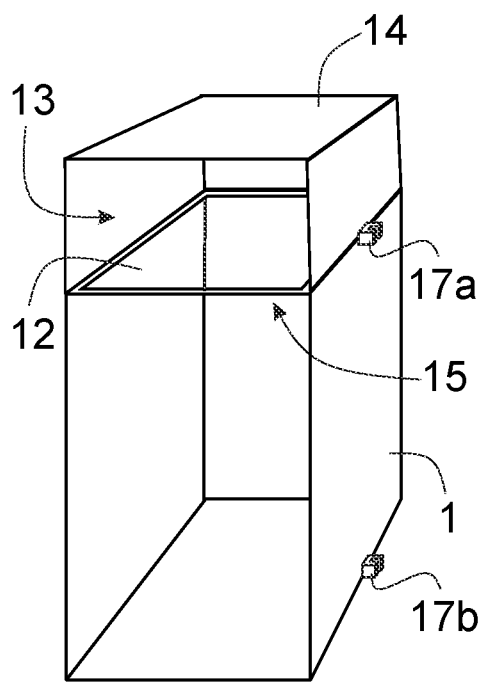
Figure 6:
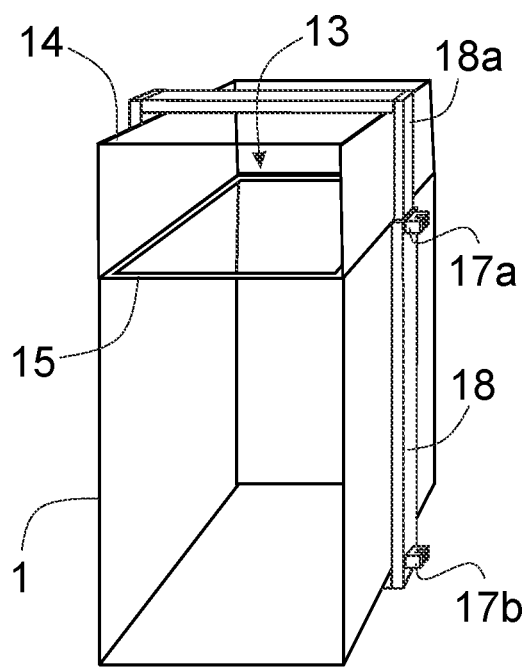
Figure 7:
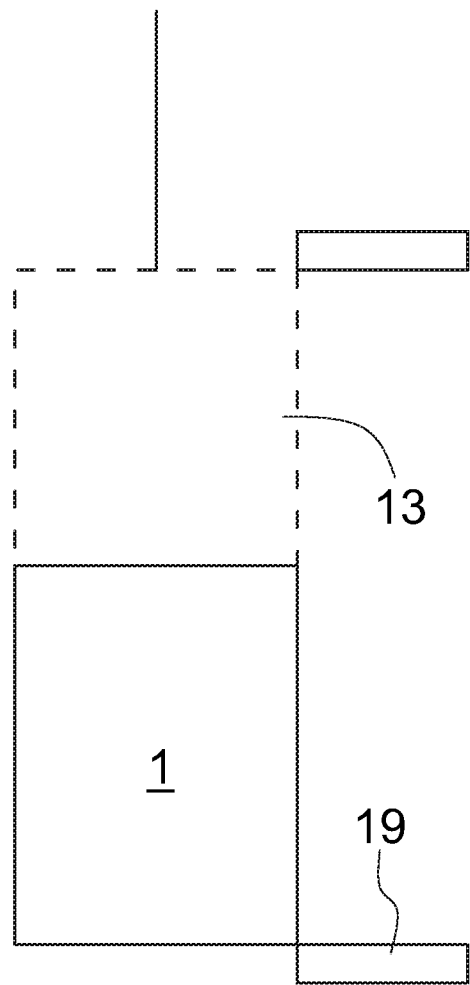
Figure 8:
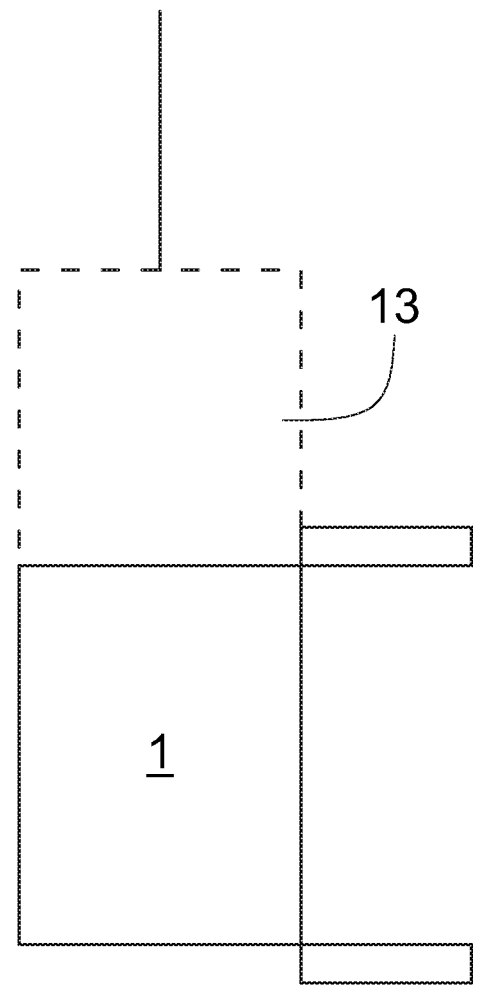

In the following, the invention will be described in detail by the aid of example embodiments by referring to the attached simplified and diagrammatic drawings, wherein FIG. 1 presents in a simplified and diagrammatic side view an elevator car according to one embodiment of the invention, FIG. 2 presents in a simplified and diagrammatic side view an elevator car according to another embodiment of the invention, FIG. 3 presents in a simplified and diagrammatic oblique side view an elevator car according to yet another embodiment of the invention, FIG. 4 presents a covering member and a roof frame for the elevator car according to embodiment of FIG. 3, FIG. 5 presents in a simplified and diagrammatic oblique side view the elevator car of FIG. 3 and the roof frame and the covering member of FIG. 4, which are attached to the elevator car, FIG. 6 presents in a simplified and diagrammatic oblique side view the elevator car of FIG. 5 fitted inside a sling, FIG. 7 presents in a simplified and diagrammatic side view an elevator car according to yet another embodiment of the invention, and FIG. 8 presents in a simplified and diagrammatic side view the elevator car of FIG. 7.

An aspect of the invention is to achieve an elevator arrangement with an elevator car having possibility to transport long construction parts to upper parts of buildings and which also removes the need to use a separate construction elevator. With the solution according to the invention it is possible to transport elements which are longer than the normal height of the elevator car.

FIG. 1 presents in a simplified and diagrammatic side view an elevator car according to one embodiment of the invention. The elevator car 1 is arranged to run up and down in an elevator shaft along guide rails 2. The elevator car 1 is mounted inside a sling, which is not shown in the FIG. 1 for the sake of clarity. The elevator car 1 comprises among others a back wall 3, side walls 4, a front wall 5, a car door 6, a roof 7, a floor 8, a doorstep 9 and a top track 10. The floor 8 is a temporary floor which is equipped with a hatch 11 and an opening 12 is arranged to be formed to the floor 8 when the hatch 11 is opened. Under the opening 12 there is an extension space 13, which increases the height of the car, thus allowing longer pieces of freight to be transported in the car. In this embodiment of the invention, the extension space 13 is surrounded with a covering member 14, which is in this embodiment a metal wire mesh. This solution makes the extension space 13 to resemble a basket. The covering member 14 is arranged to protect materials and parts being transported from being damaged. The covering member 14 under the floor 8 is reinforced to be able to carry loads. When the elevator car 1 is at its lowermost position there is a distance between the covering member 14 and the bottom of the elevator shaft. The elevator is equipped with a temporary safety member during the construction time use (CTU) to prevent the covering member 14 from hitting the bottom of the elevator shaft. When the elevator is no more needed for transporting construction materials the temporary floor is replaced with a permanent floor and the temporary safety member is removed.

FIG. 2 presents in a simplified and diagrammatic side view an elevator car according to another embodiment of the invention. In this embodiment of the invention, the roof 7 is a temporary roof which is equipped with two hatches 11 and two openings 12 are arranged to be formed to the roof 7 when the hatches 11 are opened. Above the openings 12 there are extension spaces 13, which increase the height of the car, thus allowing longer pieces of freight to be transported in the car. In this embodiment of the invention, the extension spaces 13 are surrounded with covering members 14, which are in this embodiment metal wire meshes. This solution makes the extension spaces 13 to resemble baskets. The covering members 14 are arranged to protect materials and parts being transported from being damaged. When the elevator car 1 is at its uppermost position there is a distance between the covering members 14 and the top of the elevator shaft. To prevent the covering member 14 from hitting the top of the elevator shaft a temporary safety member is installed under the buffer of the counterweight of the elevator. This safety member prevents the counterweight descending as low as in normal use. When the elevator is no more needed for transporting construction materials the temporary roof is replaced with a permanent roof and the temporary safety member is removed.

FIGS. 3, 4 and 5 present in a simplified and diagrammatic oblique side view yet another embodiment of the invention. In this arrangement, the height of the elevator car 1 is extended with help of a roof frame 15 and a covering member 14. In this embodiment, there is no sling attached to the elevator car 1 during the construction time use (CTU). Some elevator parts which are normally attached to the sling, such as upper guides 17a, of the elevator car 1, are attached to the roof frame 15. Lower guides 17b of the elevator car 1 are attached to the bottom part of the elevator car 1.

The roof frame 15 comprises edges 16 which are dimensioned so that the width and length of the roof frame 15 are substantially the same as the width and length of the elevator car 1. The roof frame 15 is attached to the top of the elevator car 1 as a temporary roof. Inside the edges 16 of the roof frame 15 is an opening 12 from inside the elevator car 1 to outside the elevator car 1. The size of the opening 12 is substantially the same as the area of the floor of the elevator car 1.

Above the opening 12 there is an extension space 13, which increases the height of the car, thus allowing longer pieces of freight to be transported in the car. In this embodiment of the invention, the extension space 13 is surrounded with a covering member 14, which is in this embodiment an extension roof made of some suitable sheet metal, which is folded so that it comprises side parts 14a and a top part 14b. The covering member 14 or the extension roof is attached to the roof frame 15. The covering member 14 is arranged to protect materials and parts being transported from being damaged. When the elevator car 1 is at its uppermost position there is a distance between the covering member 14 and the top of the elevator shaft. To prevent the covering member 14 from hitting the top of the elevator shaft a temporary safety member is installed under the buffer of the counterweight of the elevator. This safety member prevents the counterweight descending as low as in normal use. When the elevator is no more needed for transporting construction materials the temporary roof is replaced with a permanent roof and the temporary safety member is removed.

FIG. 6 presents in a simplified and diagrammatic oblique side view the elevator car of FIG. 5 fitted inside a sling. The sling 18 is extended so that the covering member 14 also fits inside the sling 18. The extension is arranged by removing the horizontal top beam of the normal sling and attaching an extension part 18a on the top of the sling 18 approximately at the height of the roof frame 15. Alternatively, the extension is arranged by a telescopic action of the vertical beams of the sling 18. Upper guides 17a of the elevator car 1 are attached to the sling 18 approximately at the height of the roof frame 15. Lower guides 17b of the elevator car 1 are attached to the bottom part of the sling 18.

In the embodiments of FIGS. 5 and 6, the guides 17a and 17b of the elevator car 1 are slide guides and the elevator car 1 is arranged to run up and down in an elevator shaft along guide rails guided by the guides. Alternatively, the guides of the elevator car 1 could be roller guides. The guide rails are not shown in FIGS. 5 and 6 for the sake of clarity.

FIGS. 7 and 8 present in a simplified and diagrammatic side view an elevator car according to yet another embodiment of the invention. In this embodiment a temporary elevator car 1 and sling are used to transport long construction elements. An extension space 13 is formed above the normal roof of the elevator car 1.

The interior height of the elevator car 1 is arranged to be extended by one of the following arrangements:
  a telescopic action of the vertical beams of the car sling and with foldable or similarly telescopic wall elements. In the extended mode the elevator is not allowed to passenger traffic.
  replacing the normal sling altogether with an extended version which is changed to normal sling after the construction phase ends.
  having a self-supporting construction time elevator car, which acts as the sling, and hence removes the need for separate sling.

During the extended mode, door openings are be made high by removing some parts from the elevator car 1. In this embodiment, the bottom floor 19 is two-stories tall to allow fast loading. In the extended mode landing doors are replaced with manual operated protection doors having the required door safety circuits.

The elevator is operated by a designated driver, with a plugin removable control-device, so that the elevator could not be operated by unauthorized users. Alternatively, a special mobile user interface is used for giving calls and monitoring the car position and load (car camera, load sensor, position indicator displayed on mobile UI), so that a driver would not need to be inside the car.

It is obvious to the person skilled in the art that the invention is not restricted to the examples described above but that it may be varied within the scope of the claims presented below. Thus, for instance the structure of the elevator car and other parts can be also different from what is presented above. For example, an elevator car can comprise extension spaces both under the elevator car and above the elevator car.

The invention claimed is:

1. An elevator arrangement having an elevator comprising an elevator car including:
    a floor;
    a roof frame having an opening, the opening of the roof frame extending an entire length and an entire width of the elevator car; and
    a covering member including:
        side parts overlap the roof frame in a vertical direction and being substantially flush with an outside of the elevator car; and
        a top part connected to the side parts to form an enclosed extension space with an opening at a bottom of the covering member,
    wherein the extension space is defined by the roof frame and the covering member and extends a height of the elevator car during construction time use,
    wherein the extension space extends from the opening of the roof frame to the covering member,
    wherein the covering member forms an entire roof of the elevator car,
    wherein the elevator car is attached to a sling, and
    wherein the sling includes an extension part that is movable in a telescoping manner and extends entirely around the extension space.

2. The elevator arrangement according to claim 1, wherein the extension space is arranged to form an additional transportation space for long construction parts or elements.

3. The elevator arrangement according to claim 1,
    wherein the elevator arrangement includes an elevator shaft, and
    wherein when the elevator car is at its uppermost position there is a distance between the covering member and a top of the elevator shaft.

* * * * *